June 6, 1961  M. E. JONES  2,987,303

INTERNAL COMBUSTION ENGINE AND FUEL SYSTEM THEREFOR

Filed Nov. 5, 1957 3 Sheets-Sheet 1

INVENTOR.
MALDWYN E. JONES
BY
Bertram H. Mann
ATTORNEY

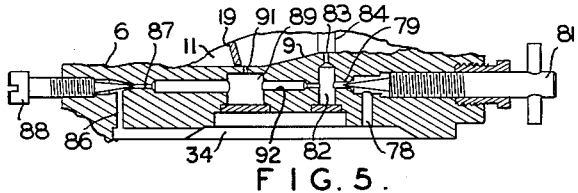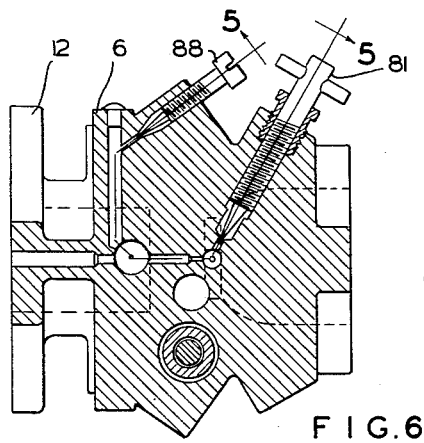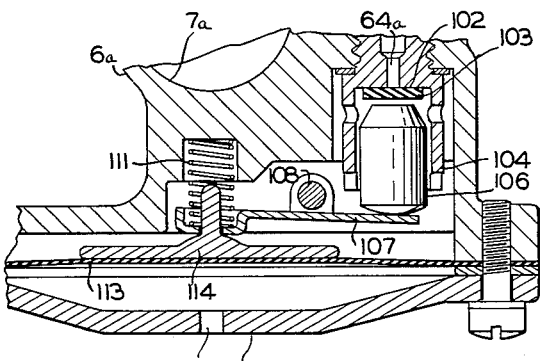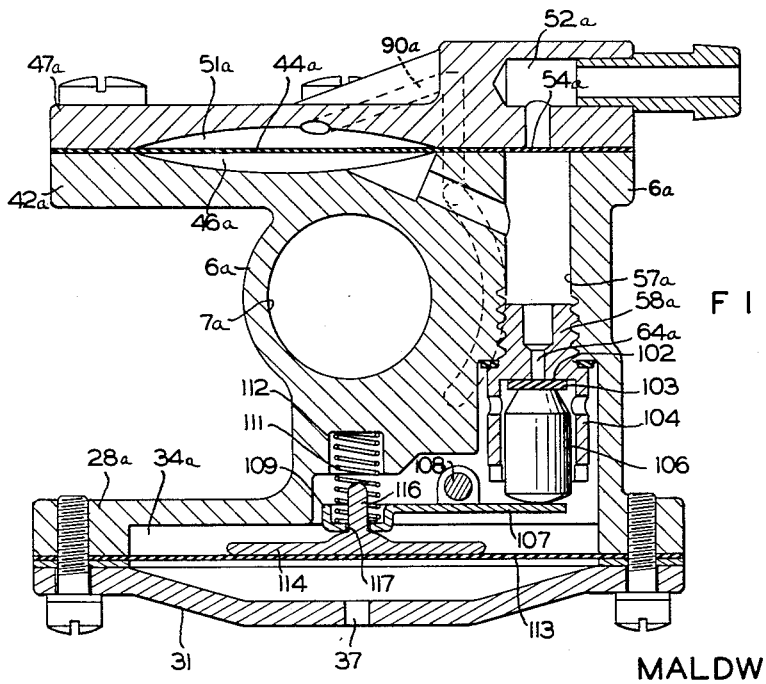

June 6, 1961 M. E. JONES 2,987,303
INTERNAL COMBUSTION ENGINE AND FUEL SYSTEM THEREFOR
Filed Nov. 5, 1957 3 Sheets-Sheet 3
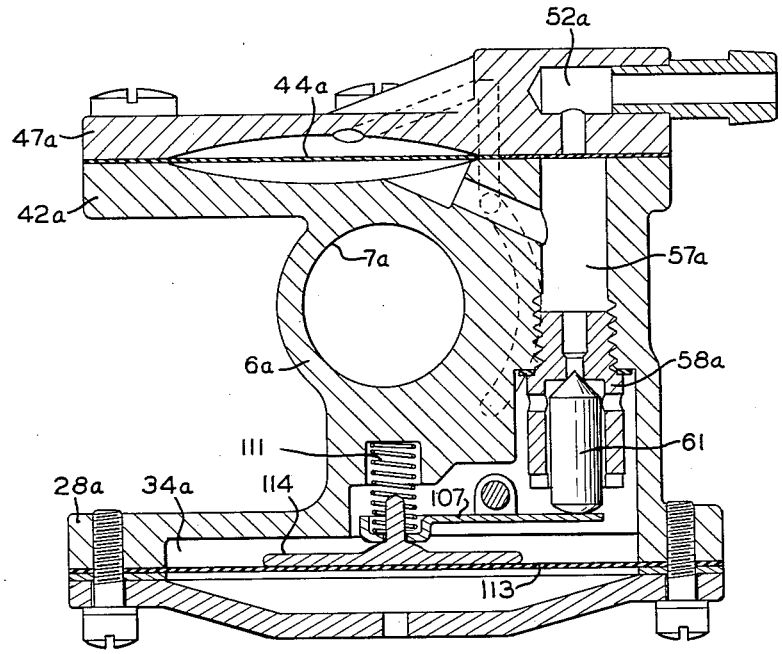
FIG. 9.
FIG. 10
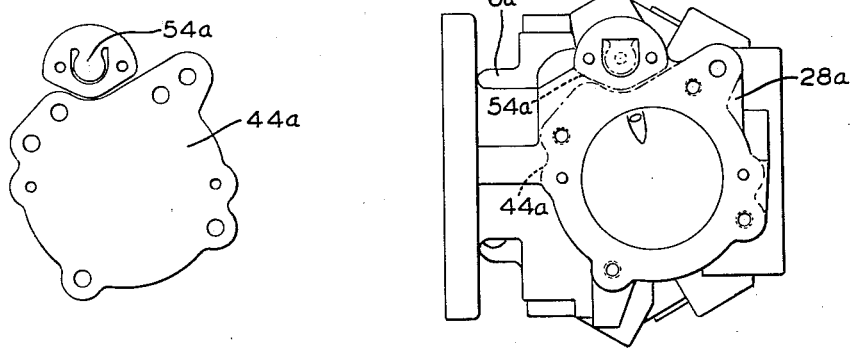
FIG. 11.
FIG. 12 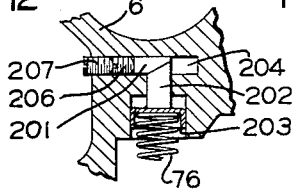 FIG. 13 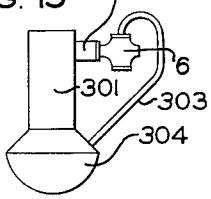
INVENTOR.
MALDWYN E. JONES
BY
Bertram H. Mann
ATTORNEY

United States Patent Office 2,987,303
Patented June 6, 1961

2,987,303
INTERNAL COMBUSTION ENGINE AND FUEL SYSTEM THEREFOR
Maldwyn E. Jones, Ferguson, Mo., assignor to ACF Industries, Incorporated, New York, N.Y., a corporation of New Jersey
Filed Nov. 5, 1957, Ser. No. 694,539
12 Claims. (Cl. 261—37)

This invention relates to internal combustion engines and fuel systems therefor, and is more particularly concerned with fuel systems for two-cycle engines employed to drive chain saws and other devices, wherein fuel must be supplied to the engine in sufficient quantities to satisfy engine requirements when the engine is in an upright, inverted or other position.

Briefly, the present invention contemplates the provision of a two-cycle engine having a crankcase subject to alternating super atmospheric and subatmospheric pressures during each cycle of the engine, and a fuel system operative responsive to said alternating pressures to supply fuel from a fuel tank to the engine, regardless of the position of the engine. During the compression stroke of the engine, a mixture of air and liquid fuel is drawn through an induction conduit into the crankcase, due to the subatmospheric pressure condition therein. During the firing stroke, the fuel mixture in the crankcase is transferred through a passageway to the combustion chamber. Pressure pulsations from the crankcase are employed to actuate a suitable pump to deliver fuel from the fuel tank to a fuel reservoir having main and idle fuel passages leading to the induction conduit.

The invention further contemplates the provision of an internal combustion engine fuel system operative responsive to variations in crankcase pressures to supply fuel to the engine in sufficient quantities to satisfy engine requirements.

The invention further contemplates the provision of an engine fuel system which is of minimum weight, occupies a minimum amount of space, and could readily be applied to engines employed to drive chain saws and other manually portable devices.

The invention further contemplates the provision of an engine fuel system which is relatively inexpensive to manufacture, and reliable in use.

The invention further contemplates the provision of an internal combustion engine fuel system in which the body of a charge forming device is cast to provide a pump cavity and a fuel chamber cavity located on opposite sides of a fuel induction passage, said cavities being interconnected by a fuel passage extending perpendicular to said induction passage.

The invention further contemplates the provision of an internal combustion engine fuel system wherein pump and pressure sensing diaphragms are each mounted on the body of the charge forming device by means of covers to provide movable walls between two chambers, said pump diaphragm serving as a movable wall between an impulse chamber and a pump chamber, and said pressure sensing diaphragm serving as a movable wall between a fuel chamber and an atmospheric chamber.

The invention further contemplates the provision of a fuel system in which the pump chamber and fuel chamber are on diametrically opposed sides of the induction passage, and said impulse chamber and atmospheric chamber are outwardly from and coaxial with their respective pump and fuel chambers.

The invention embodies other novel features, details of construction and arrangement of parts which are hereinafter set forth in the specification and claims and illustrated in the accompanying drawings, wherein:

FIG. 5 is a fragmentary sectional view taken along the line 5—5 of FIG. 6.

FIG. 6 is a sectional view taken along the line 6—6 of FIG. 1.

FIG. 7 is an enlarged transversed sectional view, corresponding to FIG. 4, illustrating a modified form of the invention, the fuel regulating means being shown in closed position.

FIG. 8 is a fragmentary sectional view, corresponding to FIG. 7, showing the fuel regulating means in open position.

FIG. 9 is an enlarged transverse sectional view, corresponding to FIG. 4, illustrating another modified form of the invention.

FIG. 10 is a detail view illustrating the pump diaphragm and the pump inlet check valve, as blanked from flexible sheet material.

FIG. 11 is a top plan view of the combined pump and charge forming device shown in FIG. 9, with the pump cover removed, to illustrate in dot and dash outline the pump diaphragm and pump inlet check valve.

FIG. 12 is a fragmentary sectional view illustrating a manual adjustment means for the fuel regulating means.

FIG. 13 is a schematic view illustrating the fuel system as applied to a four-cycle internal combustion engine.

Figure 1:
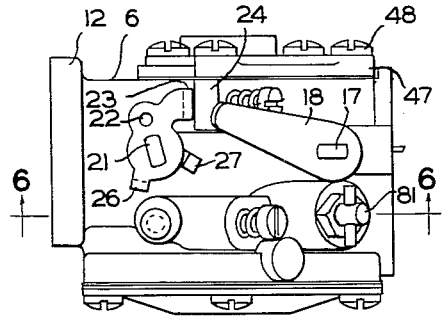
FIG. 1 is a side elevation illustrating a combined pump and charge forming device embodying features of the invention.
Figure 3:
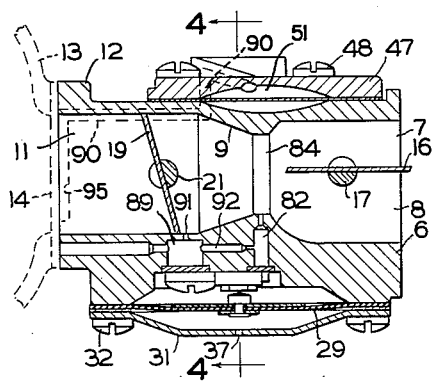
FIG. 3 is a longitudinal vertical sectional view of same.
Figure 2:
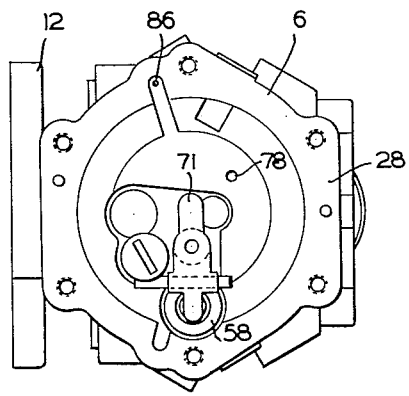
FIG. 2 is a bottom plan view of same.

Referring now to the drawings for a better understanding of the invention, and more particularly to FIGS. 1 to 6 therein, the combined fuel pump and charge forming device is shown as comprising a body 6 provided with a mixing passage 7 having an air inlet 8, a venturi 9, and an outlet 11. A mounting flange 12 is formed on the body 6 for detachable engagement to a crankcase 13 of a two-cycle internal combustion engine. A conventional reed valve 14 is interposed between the mounting flange 12 and the crankcase 13 which serve as a check valve to prevent reverse air flow from the crankcase outwardly through the mixing passage 7.

A butterfly choke valve 16 is secured to a choke valve shaft 17 within the inlet 8 of the mixing passage, the ends of the shaft being journaled in the body 6 and actuated by a choke control lever 18. A butterfly throttle valve 19 is mounted within the outlet 11 of the mixing passage 7 and secured to a shaft 21 journaled at its ends in the body 6, the shaft being actuated by a throttle control lever 22 secured to one end thereof. The throttle valve 15 is normally urged to closed position by means of a torsion spring (not shown) to yieldably resist movement of the throttle control lever 22 in a counterclockwise direction, as illustrated in FIG. 1. When the throttle valve 19 is in its closed position an arm 23 on the control lever engages a stop 24 on the body 6. To limit opening movement of the throttle valve 19 an arm 26 is provided on the throttle control lever 22 for engagement against a fixed stop 27 on the body 6.

The body 6 is formed with a base flange 28 having a flexible pressure sensing diaphragm 29 secured thereto along its marginal portion by means of a cover plate 31 and cap screws 32, the base flange being recessed at 33 to define with the diaphragm a fuel chamber 34. The cover plate 31 is formed cup-shape to define with the diaphragm 29 an atmospheric chamber 36 which is open to atmosphere by the aperture 37 in the cover plate. Washers 38 and 39 are secured to opposite sides of the diaphragm 29 by means of a button-head rivet 41.

The body 6 is formed with a top flange 42 which is recessed at 43 to define with a flexible pump diaphragm 44 a pump chamber 46, the marginal portion of the pump diaphragm being secured to the top flange 42 by means of a pump cover plate 47 and cap screws 48. The cover plate 47 is recessed at 49 to define with the diaphragm 44 an impulse chamber 51.

The top cover plate 47 is provided with a fuel inlet 52 and a valve seat 53 for engagement of an inlet check valve disc 54. An apertured Welsh plug 56 is fixed on the cover 47 to prevent displacement of the valve disc 54 from the cover.

The body 6 is provided with a fuel passage 57 leading from fuel inlet 52 to the fuel chamber 34. A valve body 58 is threaded into the body 6 within the fuel passage 57 to receive an outlet check valve disc 59 and a needle valve 61. A sleeve 62 is press-fitted within one end of the valve body 58 and is formed with a valve seat 60 for engagement by the outlet check valve 59, and a retainer 63 is fixed within the valve body 58 to limit movement of the check valve 59 from its seat 61. The valve body 58 is formed with a port 64 and a skirt 66 formed with apertures 67. A fuel filter screen 68 is mounted within the fuel passage 57 in abutting engagement against the sleeve 62. A common fuel inlet-outlet passage 69 interconnects the pump chamber 46 and the fuel passage 57.

A fuel inlet control lever 71 is pivotally mounted intermediate its ends on a pivot pin 72 within the fuel chamber 34, one end of the lever engaging the needle valve 61 and the other end of the lever being engaged by a compression spring 76 seated in a recess 77. The spring 76 normally operates to move the lever 71 in a counter-clockwise direction to urge the needle valve 61 toward its closed position. The arm 74 of the lever 71 overlies the head of the rivet 41 on the pressure sensing diaphragm 29, said arm being engaged by the rivet to pivot the lever 71 in a clockwise direction to permit the needle valve 61 to open.

As illustrated in FIG. 5, a main fuel passage 78 leads to a restricted passage 79 through which the passage of fuel is controlled by a high speed adjustment screw 81. The restricted passage 79 leads to a main fuel discharge passage 82 having a restricted outlet nozzle 83 leading into the throat 84 of the venturi 9.

An idle fuel passage 86 leads from the fuel chamber 34 to a restricted passage 87 through which the flow of fuel is controlled by an idle adjustment screw 88. The restricted passage 87 leads to a fuel chamber 89 having one or more idle ports 91 leading into the outlet 11 of the mixing passage 7 adjacent the edge of the throttle valve 19 when the latter is in its closed position. A passage 92 interconnects the main fuel passage 82 and the fuel chamber 89. An air passage 90 leads from the impulse chamber 51 to a groove 92 formed in the face of the mounting flange 12 for communication with the interior of the crankcase 13.

In the operation of the fuel system thus shown and described, pressure pulsations within the engine crankcase 13 are transmitted through the impulse passage 95—90 into the impulse chamber 51 of the pump to actuate the pump diaphragm 44. As the pump diaphragm 44 is thus flexing back and forth it acts to draw fuel through the inlet 52 and past the check valve 54 into the fuel passage 57 and thence past the outlet check valve 59.

During each compression stroke of the engine, air from the air inlet 8 and fuel from the main fuel nozzle 83 are drawn into the crankcase 13. After a certain amount of fuel has been withdrawn from the fuel chamber 34 through the main fuel discharge passage 82, the rivet 41 on the pressure sensing diaphragm 29 engages and pivots the control lever 71 in a clockwise direction to thereby allow the needle valve 61 to open and permit additional fuel to pass into the fuel chamber 34 from the fuel passage 57.

When the throttle valve 19 is in its idle position, fuel is drawn from the fuel chamber 34 into the idle passages 86 and 87 into the idle fuel chamber 89 and thence through the idle port 91 into the mixing passage 7. To prevent back bleeding of the air from the mixing passage 7 into the fuel chamber 34 when the throttle valve 19 is disposed in its idle position, a passage 92 is provided through which air is drawn from the passage 82 into the idle fuel chamber 89 and thence outwardly through the idle ports 91 into the mixing passage outlet 11.

FIGS. 7 and 8 in the drawings illustrate a modified form of the invention wherein the means for regulating the flow of fuel from the fuel inlet 52a through the fuel passage 57a into the fuel chamber 34a is shown as comprising an inlet check valve 54a. A valve body 58a is threaded into the body 6a, within the fuel passage 57a, and is formed with a restricted port 64a provided with a valve seat 102 for engagement by a disc type outlet check valve 103. The valve body 58a is formed with a skirt 104 to slidably receive a valve actuating plug 106.

A control lever 107 is pivotally mounted intermediate its ends upon a pivot pin 108 within the fuel chamber 34a, one end of the lever 107 being formed with a spring seat 109 to receive one end of a compression spring 111 seated in a recess 112 in the body 6a. The other end of the lever 107 is urged in a counter-clockwise direction by the spring 111 to move the actuator plug 106 and outlet check valve 103 against the valve seat 102. A pressure sensing diaphragm 113 forms a movable wall for the fuel chamber 34a and engages a disc member 114 which is formed with a boss 116 engaged in an aperture 117 in the spring seat 109.

In an operation of fuel system in this form of the invention, pulsations from the engine crankcase are transmitted to the pump diaphragm 44a which acts to draw fuel from the fuel inlet 52 into the fuel passage 57a. As fuel is withdrawn from the fuel chamber 34a, during operation of the engine, the pressure sensing diaphragm 113 acts through the plate 114 to pivot the lever 107 in a clockwise direction to move the actuating plug 106 and outlet check valve 103 away from the valve seat 102 to permit fuel to pass from the passage 57a into the fuel chamber 34a. This embodiment of the invention is otherwise similar to the embodiment heretofore described and illustrated in FIGS. 1 through 6 in the drawings.

FIG. 9 illustrates another embodiment of the invention which is identical to the embodiment of FIG. 7, except that a needle valve 61 is mounted for reciprocative movement in the valve body 58a, in place of the actuating plug 106 and outlet check valve 103, to control the flow of fuel from the fuel passage 57a into the fuel chamber 34a.

FIG. 10 illustrates the pump diaphragm 44a and inlet pump check valve as blanked from two sheets of flexible material. FIG. 11 shows the diaphragm and check valve as positioned on the top flange of the body 6a prior to assembly of the pump cover thereon.

Figure 4:
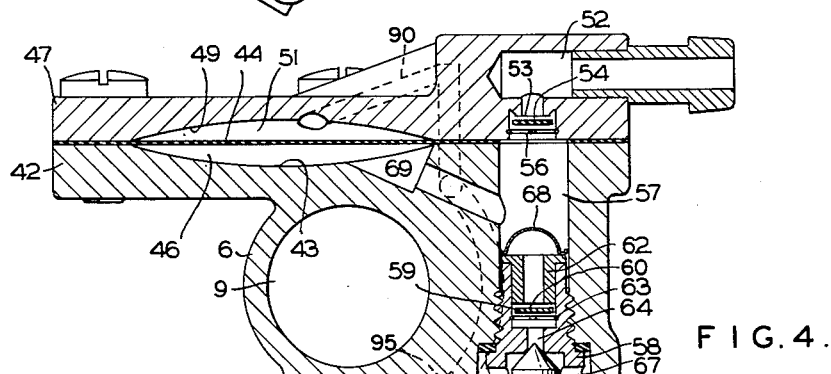
FIG. 4 is an enlarged transverse sectional view, taken along the line 4—4 of FIG. 3.

In each of the several forms of the invention, it may be desirable to vary the force exerted by the compression spring against the control lever to urge the valve toward its closed position. FIG. 12 illustrates an adjustment means which is shown as comprising a wedge 201 engaging a shank 202 on a spring seat 203, the position of the wedge in a bore 204 being adjusted by means of an adjustment screw 206 and locking screw 207. It will be understood that the spring adjustment means may be applied to any of the several forms of the invention, as shown in FIGS. 4, 7, and 9, to vary the force exerted by a compression spring against a control lever to bias its respective valve toward closed position.

FIG. 13 illustrates the fuel system as applied to a one cylinder four-cycle internal combustion engine 301 having a conventional intake manifold 302 and an intake valve (not shown). In this form of the invention, the charge forming device is bolted to the intake manifold 302 to supply liquid fuel and air thereto from the mixing passage 7 during each intake stroke of the engine. A pipe 303 leads from the engine crankcase 304 to the impulse chamber 51 of the pump to transmit pressure pulsations from the crankcase to the impulse chamber to actuate the pump diaphragm 44. This embodiment of the invention is otherwise similar to the embodiments heretofore shown and described.

It will be noted that the fuel systems thus shown and described are relatively inexpensive in construction due to the manner in which the pump structure and control structure are arranged on opposite sides of the mixing passage, whereby a single casting may be formed with a pump cavity, a fuel chamber cavity, and a fuel passage interconnecting said cavities. It will also be noted that the provision of flat flanges 28 and 42 on opposite sides of the cast body 6 greatly facilitates the several machining operations, such as finishing the outer faces of the flanges, drilling the several fuel passages, tapping the flanges, and assembling the valve body 58 and other parts on the cast body.

While the invention has been shown in several forms, it is obvious to those skilled in the art that it is not so limited but is susceptible of various changes and modifications without departing from the invention as defined in the appended claims.

I claim:

1. In a fuel supply means for an internal combustion engine, a main body having a fuel mixing passage extending therethrough and having flanges at opposite sides thereof, the outer face of each flange having a recess therein, an apertured base plate, a pressure sensing diaphragm having its marginal portion engaged between one of said faces and said apertured base plate to define a fuel chamber and an atmospheric chamber, a cover having a fuel inlet, a check valve in said fuel inlet, a pump diaphragm having its marginal portion engaged between the other of said faces and said cover to define a pump chamber and an impulse chamber, a straight inlet fuel passage in said body leading from said fuel inlet to said fuel chamber, a control valve at the outlet end of said straight inlet fuel passage actuated by said pressure sensing diaphragm to control the flow of fuel into said fuel chamber, a main fuel outlet passage and an idling fuel passage leading from said fuel chamber to said mixing passage, a common inlet-outlet passage connecting said pump chamber with said straight fuel inlet passage intermediate said inlet check valve and said control valve, and means providing a passage for pressure pulsations to said impulse chamber, said diaphragms being in parallel planes, and said straight inlet fuel passage being normal to said planes.

2. A fuel supply means according to claim 1 wherein, a valve body is detachably mounted within said inlet fuel passage, and said control valve and a check valve are coaxially mounted in said valve body.

3. Fuel supply means for an internal combustion engine comprising a body forming an induction conduit for connection with the engine, a fuel chamber adjacent said conduit and having a movable wall, a fuel discharge duct connecting said chamber and said conduit, a fuel supply passage also communicating with said chamber, means to cause the fuel pressures in said passage and said chamber to fluctuate above and below each other, a one-way check valve in said passage for preventing the return of fuel from said chamber to said passage whereby fuel flows from said passage to said chamber and not vice versa, and an operative connection between said movable wall and said check valve for transmitting pressure variations in said conduit and said chamber thereto whereby said valve functions jointly as a pump check valve and a pressure regulator valve.

4. Fuel supply means according to claim 3 in which said fluctuating pressure producing means includes a pump communicating with said supply passage, said valve functioning jointly as an outlet check for said pump and a pressure regulator valve for said chamber.

5. Fuel supply means for an internal combustion engine comprising a body forming an induction conduit, means to connect said conduit to a portion of the engine, a fuel chamber adjacent said conduit, a fuel discharge passage connecting said chamber and said conduit, said chamber having a movable wall, a pump having a movable wall, means to expose said pump movable wall to pressure pulsations for causing pumping action, a supply passage connecting said pump and said chamber, a pump outlet check valve in said passage, and an operative connection between said chamber movable wall and said valve whereby said valve serves also, in conjunction with said chamber movable wall, as a pressure regulator for said chamber.

6. Fuel supply means according to claim 5 in which said operative connection between said valve and said chamber movable wall includes means normally urging said valve closed and yieldably resisting opening of said valve under the influence of pressure pulsations transmitted either from said pump or said mixture conduit.

7. Fuel supply means for an internal combustion engine comprising a body forming an induction conduit, a fuel chamber at one side of said conduit, a diaphragm extending along one side of said chamber, a fuel discharge passage connecting said chamber and said conduit, a pumping chamber at the opposite side of said conduit, a pumping diaphragm extending across said latter chamber, means to expose said pumping diaphragm to pulsations, a fuel supply passage connecting said pump and fuel chambers, a regulator valve in said supply passage, and a one-way operative connection between said fuel chamber diaphragm and said regulator valve.

8. Fuel supply means according to claim 7 in which a single valve is provided in said fuel supply passage, which valve serves jointly as a pump outlet check and a fuel chamber regulator valve.

9. Fuel supply means according to claim 7 in which said fuel chamber and pumping diaphragms are secured to said body and arranged compactly and symmetrically on opposite sides of said mixture conduit, said fuel supply passage extending through said body transversely of said conduit.

10. Fuel supply means for an internal combustion engine comprising a body forming a mixture conduit, a fuel chamber and a pumping chamber formed in said body at diametrically opposite sides of said conduit, a fuel discharge passage connecting said fuel chamber and said conduit for feeding fuel to said conduit responsive to suction therein, regulator and pumping diaphragms secured respectively across and sealing each of said fuel and pumping chambers, a cap securing said pumping diaphragm in position and forming a pulsation chamber, a duct extending in said body along said mixture conduit for transmitting pressure pulsations to said pulsation chamber, a fuel supply passage in said body connecting said fuel and pumping chambers, a regulator valve in said supply passage, and a one-way operative connection between said regulator diaphragm and regulator valve for controlling the supply of fuel to said fuel chamber in accordance with suction pulsations in said conduit, said regulator valve being the sole valve between said pumping and fuel chambers and serving, also, as a pump outlet check.

11. Fuel supply means for an internal combustion engine comprising a body forming an induction conduit, a fuel chamber at one side of said conduit, a diaphragm extending along one side of said chamber, a fuel discharge passage connecting said chamber and said conduit, a pumping chamber at the opposite side of said conduit, a pumping diaphragm extending across said latter chamber, means to expose said pumping diaphragm to pulsations, a fuel supply passage connecting said pump and fuel chambers, valve means comprising a regulator valve in said supply passage, and a one-way operative connection between said fuel chamber diaphragm and said regulator valve.

12. Fuel supply means for an internal combustion engine comprising a body forming an induction conduit, a fuel chamber at one side of said conduit, a diaphragm extending along one side of said chamber, a fuel discharge passage connecting said chamber and said conduit, a pumping chamber at the opposite side of said conduit, a pumping diaphragm extending across said latter chamber, means to expose said pumping diaphragm to pulsations, a fuel supply passage connecting said pump and fuel chambers, valve means comprising a regulator valve and a check valve in said supply passage, and a one-way operative connection between said fuel chamber diaphragm and said regulator valve.

References Cited in the file of this patent
UNITED STATES PATENTS

| | | |
|---|---|---|
| 2,323,984 | Ericson | July 13, 1943 |
| 2,519,569 | Hart | Aug. 22, 1950 |
| 2,713,854 | Conover | July 26, 1955 |
| 2,796,838 | Phillips | June 25, 1957 |
| 2,801,621 | Anderson | Aug. 6, 1957 |